(12) United States Patent
Zhang et al.

(10) Patent No.: US 8,819,052 B2
(45) Date of Patent: Aug. 26, 2014

(54) TRAFFIC DRIVER FOR SUGGESTING STORES

(75) Inventors: Xiaodi Zhang, Palo Alto, CA (US); Jun Hang, Shanghai (CN)

(73) Assignee: eBay Inc., San Jose, CA (US)

( * ) Notice: Subject to any disclaimer, the term of this patent is extended or adjusted under 35 U.S.C. 154(b) by 130 days.

(21) Appl. No.: 12/916,198

(22) Filed: Oct. 29, 2010

(65) Prior Publication Data

US 2011/0238645 A1    Sep. 29, 2011

Related U.S. Application Data

(60) Provisional application No. 61/318,772, filed on Mar. 29, 2010.

(51) Int. Cl.
*G06F 17/30*    (2006.01)
*G06F 7/00*     (2006.01)

(52) U.S. Cl.
CPC ...... *G06F 17/3064* (2013.01); *G06F 17/30389* (2013.01); *G06F 17/30554* (2013.01)
USPC .......................................... 707/767; 707/769

(58) Field of Classification Search
USPC ........... 707/767, 766, 769, 999.003, 999.004, 707/999.005, 999.007, 999
See application file for complete search history.

(56) References Cited

U.S. PATENT DOCUMENTS

| | | | |
|---|---|---|---|
| 5,852,823 A | 12/1998 | De Bonet | |
| 6,393,427 B1 | 5/2002 | Vu et al. | |
| 6,446,061 B1 | 9/2002 | Doerre et al. | |
| 6,564,213 B1* | 5/2003 | Ortega et al. | ............ 1/1 |
| 6,751,600 B1 | 6/2004 | Wolin | |
| 6,925,196 B2 | 8/2005 | Kass et al. | |
| 6,941,321 B2 | 9/2005 | Schuetze et al. | |

(Continued)

FOREIGN PATENT DOCUMENTS

| | | |
|---|---|---|
| WO | WO-0111491 A1 | 2/2001 |
| WO | WO-2012030672 A1 | 3/2012 |
| WO | WO-2012030674 A2 | 3/2012 |
| WO | WO-2012033654 A2 | 3/2012 |

OTHER PUBLICATIONS

U.S. Appl. No. 10/979,604, Non Final Office Action mailed Dec. 20, 2010, 24 pgs.

(Continued)

*Primary Examiner* — Dung K Chau
(74) *Attorney, Agent, or Firm* — Schwegman Lundberg & Woessner, P.A.

(57) ABSTRACT

A system and method for providing a suggested store at or through which to purchase a product or service. When a user enters a query for a product or service into a user interface, the system may use the query as a search argument to search files to find one or more pictures illustrating information about a product or service represented by the query. The picture could illustrate where the queried product or service may be purchased. Auto-complete processes may also be used to process the query as it is being entered, to generate an auto-suggestion key word based on fewer than all the letters of the query, to use as a search argument for the search. Both the query and the auto-suggestion key word may be used as search arguments to find the relevant picture in a variety of search logic sequences to provide the picture to the user.

46 Claims, 15 Drawing Sheets

(56) References Cited

U.S. PATENT DOCUMENTS

| | | | |
|---|---|---|---|
| 7,035,440 B2 | 4/2006 | Kaku | |
| 7,315,833 B2 | 1/2008 | Schrenk | |
| 7,437,321 B2 | 10/2008 | Hanechak | |
| 7,996,282 B1 | 8/2011 | Scott et al. | |
| 2002/0035518 A1 | 3/2002 | Kano | |
| 2002/0106111 A1 | 8/2002 | Kass et al. | |
| 2003/0004815 A1* | 1/2003 | Sakai et al. | 705/26 |
| 2003/0208396 A1* | 11/2003 | Miller et al. | 705/14 |
| 2004/0182413 A1 | 9/2004 | de Laforcade | |
| 2005/0022106 A1 | 1/2005 | Kawai et al. | |
| 2005/0164273 A1 | 7/2005 | Stoughton et al. | |
| 2006/0080182 A1 | 4/2006 | Thompson et al. | |
| 2006/0248078 A1* | 11/2006 | Gross et al. | 707/5 |
| 2007/0078850 A1* | 4/2007 | Aziz et al. | 707/6 |
| 2007/0208714 A1* | 9/2007 | Ture et al. | 707/3 |
| 2008/0040339 A1* | 2/2008 | Zhou et al. | 707/5 |
| 2008/0040671 A1 | 2/2008 | Reed | |
| 2008/0069540 A1* | 3/2008 | Takagi et al. | 386/117 |
| 2008/0242279 A1* | 10/2008 | Ramer et al. | 455/414.2 |
| 2009/0094138 A1 | 4/2009 | Sweitzer et al. | |
| 2009/0094260 A1 | 4/2009 | Cheng et al. | |
| 2009/0138376 A1 | 5/2009 | Smyers et al. | |
| 2009/0182612 A1 | 7/2009 | Challener et al. | |
| 2009/0193675 A1 | 8/2009 | Sieber | |
| 2009/0271293 A1 | 10/2009 | Parkhurst et al. | |
| 2010/0030578 A1* | 2/2010 | Siddique et al. | 705/3 |
| 2010/0076994 A1* | 3/2010 | Soroca et al. | 707/769 |
| 2011/0093361 A1 | 4/2011 | Morales | |
| 2011/0161182 A1 | 6/2011 | Racco | |
| 2011/0184831 A1 | 7/2011 | Dalgleish | |
| 2011/0235902 A1 | 9/2011 | Chittar et al. | |
| 2011/0238534 A1 | 9/2011 | Yakkala | |
| 2011/0238536 A1 | 9/2011 | Liu et al. | |
| 2011/0238659 A1 | 9/2011 | Chittar et al. | |
| 2011/0314031 A1 | 12/2011 | Chittar et al. | |
| 2012/0054041 A1 | 3/2012 | Williams | |
| 2012/0054059 A1 | 3/2012 | Rele | |
| 2012/0054060 A1 | 3/2012 | Kundu | |
| 2012/0159294 A1 | 6/2012 | Gonsalves et al. | |
| 2013/0085900 A1 | 4/2013 | Williams | |

OTHER PUBLICATIONS

U.S. Appl. No. 12/423,655, Response filed Jul. 19, 2010 to Non Final Office Action mailed Mar. 19, 2010, 11 pgs.
U.S. Appl. No. 12/749,458, Response filed May 1, 2012 to Non Final Office Action mailed Feb. 3, 2012, 22 pgs.
U.S. Appl. No. 12/749,458, Non Final Office Action Mailed Feb. 3, 2012, 26 pgs.
U.S. Appl. No. 12/749,458, Non Final Office Action mailed Jul. 20, 2012, 24 pgs.
U.S. Appl. No. 12/749,458, Response filed Oct. 18, 2012 to Non Final Office Action mailed Jul. 20, 2012, 19 pgs.
U.S. Appl. No. 12/749,467, Response filed May 11, 2012 to Non Final Office Action mailed Mar. 1, 2012, 17 pgs.
U.S. Appl. No. 12/749,467, Final Office Action mailed Jul. 19, 2012, 23 pgs.
U.S. Appl. No. 12/749,467, Non Final Office Action mailed Mar. 1, 2012, 20 pgs.
U.S. Appl. No. 12/749,467, Preliminary Amendment filed Aug. 9, 2010, 4 pgs.
U.S. Appl. No. 12/749,467, Preliminary Amendment filed Oct. 25, 2010, 4 pgs.
U.S. Appl. No. 12/749,467, Response filed Sep. 18, 2012 to Final Office Action mailed Jul. 19, 2012, 17 pgs.
U.S. Appl. No. 13/011,374, Non Final Office Action mailed Dec. 14, 2012, 12 pgs.
U.S. Appl. No. 13/011,510, Response filed Jan. 9, 2012 to Non Final Office Action mailed Oct. 11, 2011, 10 pgs.
U.S. Appl. No. 13/011,510, Final Office Action mailed Mar. 19, 2012, 13 pgs.
U.S. Appl. No. 13/011,510, Non Final Office Action mailed Oct. 11, 2011, 13 pgs.
U.S. Appl. No. 13/011,510, Notice of Allowance mailed Nov. 15, 2012, 10 pgs.
U.S. Appl. No. 13/011,510, Response filed Aug. 20, 2012 to Final Office Action mailed Mar. 19, 2012, 13 pgs.
"Dictionary.com, definition of silhouette", [Online] Retrieved from the Internet: http://dictionary.reference.com/browse/silhouette?s=t, (Accessed Jul. 13, 2012), 2 pgs.
International Application Serial No. PCT/US2011/49449, Search Report mailed Jan. 19, 2012, 2 pgs.
International Application Serial No. PCT/US2011/49449, Written Opinion mailed Jan. 19, 2012, 6 pgs.
International Application Serial No. PCT/US2012/058101, Search Report mailed Nov. 29, 2012, 2 pgs.
International Application Serial No. PCT/US2012/058101, Written Opinion mailed Nov. 29, 2012, 4 pgs.
"Shop It to Me: About Us", [Online]. Retrieved from the Internet: <URL: http://www.shopittome.com/about_us>, (Accessed Nov. 13, 2010), 2 pgs.
"The Watershed Transformation", [Online]. Retrieved from the Internet: <URL: http://cmm.ensmp.fr/~beucher/wtshed.html>, (Accessed Mar. 9, 2010), 11 pgs.
Huang, Zhi-Kai, et al., "Segmentation of color textures using K-means cluster based wavelet image fusion", Applied Mechanics and Materials, (Jan. 12, 2010), 209-214.
Meyer, Fernand, et al., "Multiscale Morphological Segmentations Based on Watershed, Flooding, and Eikonal PDE", Scale-Space '99, LNCS 1682, (1999), 351-362.
U.S. Appl. No. 13/250,490, Final Office Action mailed Nov. 29, 2013, 13 pgs.
U.S. Appl. No. 13/250,490, Response filed Sep. 27, 2013 to Non Final Office Action mailed Jun. 27, 2013, 19 pgs.
U.S. Appl. No. 13/250,490, Non Final Office Action mailed Jun. 27, 2013, 9 pgs.
U.S. Appl. No. 13/250,490, Response filed Apr. 23, 2013 to Restriction Requirement mailed Feb. 28, 2013, 8 pgs.
U.S. Appl. No. 13/250,490, Restriction Requirement mailed Feb. 28, 2013, 6 pgs.
"www.macys.com", [Online]. Retrieved from the Internet: <URL: <www.archive.org>, (Accessed Dec. 31, 2010), 11 pgs.

* cited by examiner a. The file name format can be [number] + [landing page name]
b. "Number" can be 100, 110, 120, 130.....
c. File format can be TXT
d. For example, 110_Anne_Taylor.txt

| Field Name | Description |
|---|---|
| PICTURE NAME | • Identify the picture |
| PERIOD | • The valid period for this picture |
| USER INPUT KEY WORD_EXACTMATCH, USER INPUT KEY WORD_STARTWITH, USER INPUT KEY WORD_INCLUDE, AUTO-SUGGESTION KEYWORDS_EXACTMATCH, AUTO-SUGGESTION KEYWORDS_STARTWITH, AUTO-SUGGESTION KEYWORDS_INCLUDE | • The mapping for user input keywords or auto-suggestion keywords with the priority from top to bottom as one example |
| PICTURE URL | • URL of the picture<br>• Format can be http:// |
| PAGE URL | • URL of the destination page<br>• Format can be http:// |

FIG. 4B

AUTO COMPLETE IS ACTIVE

THE USER ENTERS A QUERY

WHEN THE USER HAS ENTERED A MINIMUM NUMBER OF LETTERS TO TRIGGER THE AUTO-COMPLETE APPLICATION, THAT APPLICATION GENERATES AN AUTO-SUGGESTION KEYWORD FROM THE FIRST FEW LETTERS OF THE USER'S INPUT

THE USER COMPLETES THE INPUT OF THE QUERY AND GENERATES A USER KEY WORD

THE SYSTEM USES THE USER KEY WORD FIRST TO SEARCH THE FILE FOR A PICTURE THAT MATCHES THE USER KEY WORD

IF THE USER KEY WORD MATCHES THE PICTURE IN THE FILE, TRANSMIT THE PICTURE FOR DISPLAY

IF NO MATCH, THEN USE THE AUTO-SUGGESTION KEY WORD TO SEARCH THE FILE FOR A PICTURE THAT MATCHES

IF THE AUTO-SUGGEST KEY WORD MATCHES A PICTURE IN THE FILE, TRANSMIT THE PICTURE FOR DISPLAY

FIG. 5

FIRST USE THE AUTO-SUSGGESTION KEY WORD TO SEARCH A FIRST FILE FOR A PICTURE THAT MATCHES THE USER KEYWORD

IF THE AUTO-SUGGESTION KEY WORD MATCHES A PICTURE IN THE FILE, TRANSMIT THE PICTURE FOR DISPLAY

IF THE AUTO-SUGGESTION KEY WORD PRODUCES NO MATCH, THEN USE THE USER KEY WORD TO SEARCH THE FILE FOR A PICTURE THAT MATCHES

IF THE USER KEY WORD PRODUCES A MATCH, TRANSMIT THE PICTURE FOR DISPLAY

IF NO MATCH IS FOUND, REPEAT THE ABOVE FOUR STEPS TO SEARCH ANOTHER FILE

CONTINUE SEARCHING BY REPEATING THE ABOVE STEPS UNTIL A PICTURE IS FOUND THAT MATCHES EITHER THE AUTO-SUGGESTION KEY WORD OR THE USER KEY WORD

TRANSMIT THE PICTURE FOR DISPLAY

FIG. 6 ann
ann taylor
ann demeulemeester
anna sui
ann taylor loft
anne klein
annalee
raggedy ann
anne klein watch
Plain text
*popular products*
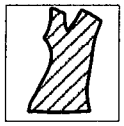 ann taylor only exclusive blouses & tops
 anna sui 2009 blouses
Product
ANN TAYLOR   outlet store
Traffic Driver Picture
*Hide eBay suggestions* 
FIG. 9

FIG. 10 ebaY ann ann taylor
ann demeulemeester
anna sui
ann taylor loft
anne klein
annalee
raggedy ann
anne klein watch
annalee dolls
harley davidson 100 anniversary ANN TAYLOR   outlet store Hide eBay suggestions

TORS | STORES | DAILY DEAL eals with free shipping-
mystery holideal

UP TO 60% OFF DKNY

My eBay at a glance

Watching (10)

Hurry! ED HARDY $203.00
Buy It Now!
6hrs 13min

Relevant pictures displayed in search suggestion drop down box

DKNY

60% OFF
SHOP NOW

Graphic A is for Ann Taylor, B is for Anna Sue

A ANN TAYLOR  outlet store

B ANNA SUI  outlet store

FIG. 11A

Graphic A file name is 100_Ann_Taylor.txt, the details in file are:

PICTURE_NAME=ann_taylor

PERIOD=20100315-20100401

USER_INPUT_EXACTMATCH="Ann", "Ann ", "Ann T", "Ann Ta", "Ann Tay", "Ann Tayl", "Ann Taylo", "Ann Taylor"

SUGGESTION_KEYWORDS_INCLUDE="Taylor"

PICTURE_URL=http://..../ann_taylor.gif

PAGE_URL="http://anntaylor.ebay.com"

FIG. 11B

Graphic B file name is 200_Anna_Sue.txt, the details in file are:

PICTURE_NAME=anne_sue

PERIOD=20100315-20100410

USER_INPUT_EXACTMATCH="Ann", "Anne "

USER_INPUT_INCLUDE="Anne Sue"

PICTURE_URL=http://..../anne_sue.gif

PAGE_URL="http://annesue.ebay.com"

| No | Time | Query | Behavior Reasoning |
|---|---|---|---|
| 1 | During Mar 15 to Apr 1 in 2010 | Ann | Although two graphics have mapped to keywords "Ann", since A has higher priority than B (from the file name), so A will be displayed<br><br>ANN TAYLOR    outlet store |
| 2 | During Mar 15 to Apr 1 in 2010 | Anne | ANNA SUI    outlet store |
| 3 | During Mar 15 to Apr 1 in 2010 | Ann P | Not any graphic will be surfaced |
| 4 | During Mar 15 to Apr 1 in 2010 | Tay | Assume "Tay" would trigger auto suggestion "Taylor", so A would be displayed<br><br>ANN TAYLOR    outlet store |

| | | | |
|---|---|---|---|
| 5 | During Mar 15 to Apr 1 in 2010 | Ann Taylor | ANN TAYLOR    outlet store |
| 6 | During Mar 15 to Apr 1 in 2010 | Anne Sue Bag | ANNA SUI    outlet store |
| 7 | During Apr 1 to Apr 10 in 2010 | Ann | Since the running time is out of valid period for Ann Taylor, so B would be surfaced in this case<br><br>ANNA SUI    outlet store |

FIG. 11D *(continued)*

TRAFFIC DRIVER FOR SUGGESTING STORES

RELATED APPLICATIONS

This patent application claims the benefit of the filing date of the provisional patent application with Application Ser. No. 61/318,772, filed on Mar. 29, 2010, entitled, "SEARCH SUGGESTIONS FOR STORES", which is hereby incorporated herein by reference.

TECHNICAL FIELD

The present disclosure generally relates to data processing techniques. More specifically, the present disclosure relates to methods and systems for managing how search results are processed and presented to a user of a computer-based trading or e-commerce application.

BACKGROUND

Advancements in computer and networking technologies have enabled persons to conduct commercial and financial transactions "on-line" via computer-based applications. This has given rise to a new era of commerce. A number of well-known retailers have expanded their presence and reach by operating websites that facilitate this. In addition, many new retailers, which operate exclusively online, have come into existence. The business models utilized by enterprises operating online are almost as varied as the products and services offered. For instance, some products and services are offered at fixed prices, while others are offered via various auction methods, and still others are offered via a system of classified ad listings. Some enterprises specialize in the selling of a specific type of product (e.g., books) or a specific service (e.g., tax preparation), while others provide a myriad of categories of items and services from which to choose. Some enterprises serve only as an intermediary, connecting sellers and buyers, while others sell directly to consumers.

Despite the many technical advances that have improved the state of e-commerce, a great number of technical challenges and problems remain. One such problem involves determining how to provide a better shopping experience, and at the same time drive traffic to selected stores and/or landing pages, so as to maximize the likelihood that a transaction (e.g., the sale of a product or service) will occur for the store. For instance, when a shopper performs an on-line search for a product or service, it may often be the case that the shopper will find the product or service sought after but may not find a store, whether online or otherwise, from which to purchase the item. Furthermore, it is well established that the presentation of an easier and more efficient shopping experience can affect whether potential buyers ultimately purchase the listed product or service. Providing a suggested store at or through which to purchase the product or service provides an easier and more efficient shopping experience, which is desired. At the same time, from a seller's standpoint, it would be desirable to drive more traffic for particular products to selected stores, online or otherwise, while at the same providing a better shopping experience for the buyer.

DESCRIPTION OF THE DRAWINGS

Some embodiments are illustrated by way of example and not limitation in the figures of the accompanying drawings, in which:

FIG. 4B illustrates examples of fields that might be used in configuration files useable in an embodiment of the invention;

FIG. 5 illustrates a method useable in an embodiment of the invention;

FIG. 6 illustrates a further method useable in an embodiment of the invention;

FIG. 9 illustrates an example of plain text keywords, products, and a traffic driver picture useable in an embodiment of the invention;

FIG. 10 illustrates an example of a picture in a drop down display with a web page in the background according to one embodiment of the invention;

FIG. 11A illustrates two pictures useful in an embodiment of the invention;

FIG. 11B illustrates an example of how a first picture of FIG. 11A can be configured in a configuration file.

FIG. 11C illustrates how a second picture of FIG. 11A can be configured in a configuration file.

FIG. 11D is a step by step illustration of the pictures that can be displayed with various, and the reasoning for the behavior of the system in respect of the queries.

DETAILED DESCRIPTION

Platform Architecture

Figure 1:
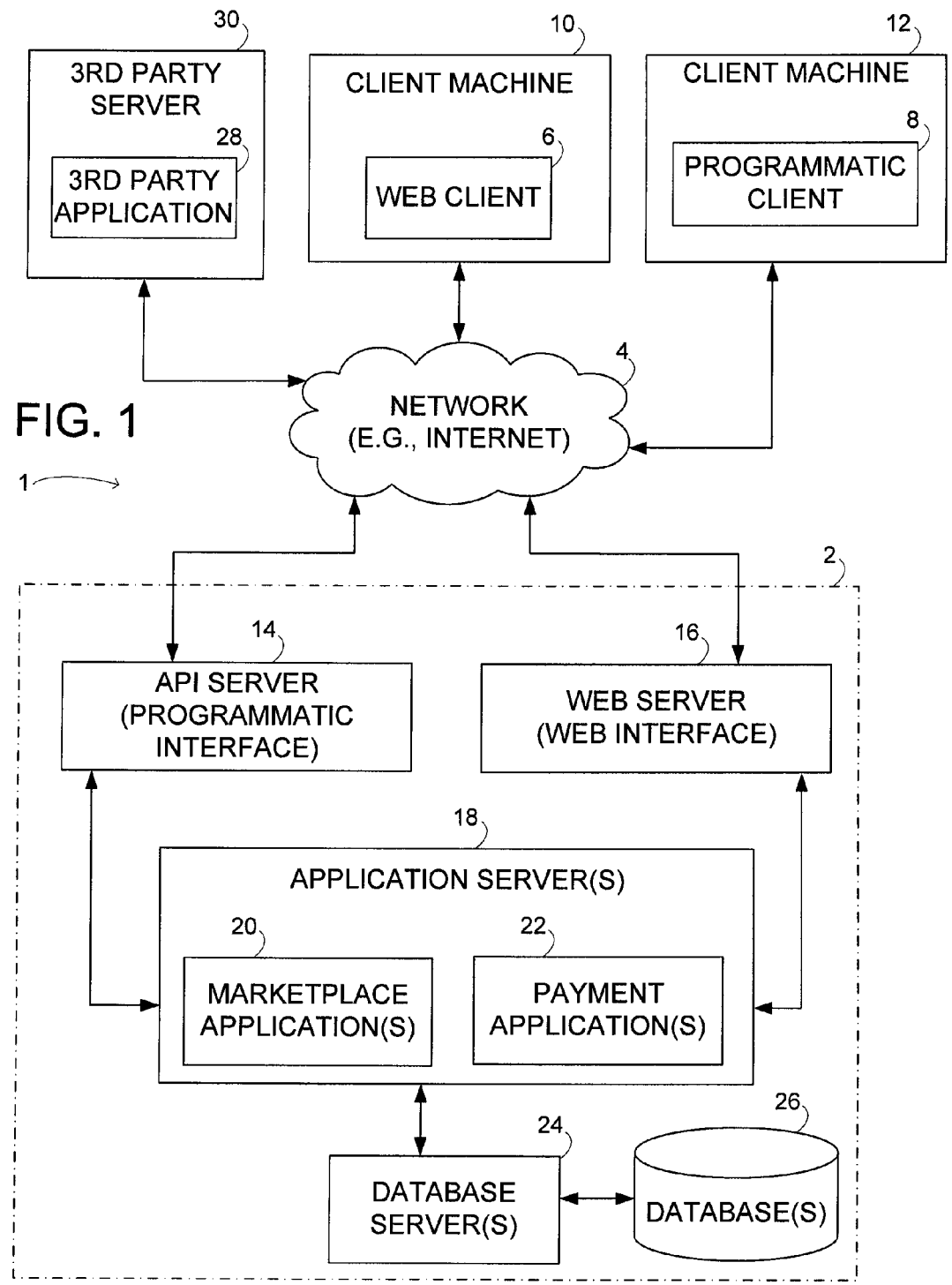
FIG. 1 is a block diagram of a network environment including a network-connected client system and server system, with which an embodiment of the invention might be implemented.

FIG. 1 is a network diagram depicting a client-server system 100, within which one example embodiment may be deployed. A networked system 2, in the example forms of a network-based marketplace or publication system, provides server-side functionality, via a network 4 (e.g., the Internet or Wide Area Network (WAN)) to one or more clients. FIG. 1 illustrates, for example, a web client 6 (e.g., a browser, such as the Internet Explorer browser developed by Microsoft Corporation of Redmond, Wash. State), and a programmatic client 8 executing on respective client machines 10 and 12.

An Application Program Interface (API) server 14 and a web server 16 are coupled to, and provide programmatic and web interfaces respectively to, one or more application servers 18. The application servers 18 host one or more marketplace applications 20 and payment applications 22. The application servers 18 are, in turn, shown to be coupled to one or more databases servers 24 that facilitate access to one or more databases 26.

The marketplace applications 20 may provide a number of marketplace functions and services to users that access the networked system 2. The payment applications 22 may likewise provide a number of payment services and functions to users. The payment applications 22 may allow users to accumulate value (e.g., in a commercial currency, such as the U.S. dollar, or a proprietary currency, such as "points") in accounts, and then later to redeem the accumulated value for products (e.g., goods or services) that are made available via the marketplace applications 20. While the marketplace and payment applications 20 and 22 are shown in FIG. 1 to both form part of the networked system 2, it will be appreciated that, in alternative embodiments, the payment applications 22 may form part of a payment service that is separate and distinct from the networked system 2.

Further, while the system 100 shown in FIG. 1 employs a client-server architecture, the present invention is of course not limited to such an architecture, and could equally well find application in a distributed, or peer-to-peer, architecture system, for example. The various marketplace and payment applications 20 and 22 could also be implemented as standalone software programs, which do not necessarily have networking capabilities.

The web client 6 accesses the various marketplace and payment applications 20 and 22 via the web interface supported by the web server 16. Similarly, the programmatic client 8 accesses the various services and functions provided by the marketplace and payment applications 20 and 22 via the programmatic interface provided by the API server 14. The programmatic client 8 may, for example, be a seller application (e.g., the TurboLister application developed by eBay Inc., of San Jose, Calif.) to enable sellers to author and manage listings on the networked system 2 in an off-line manner, and to perform batch-mode communications between the programmatic client 8 and the networked system 2.

Figure 1A:
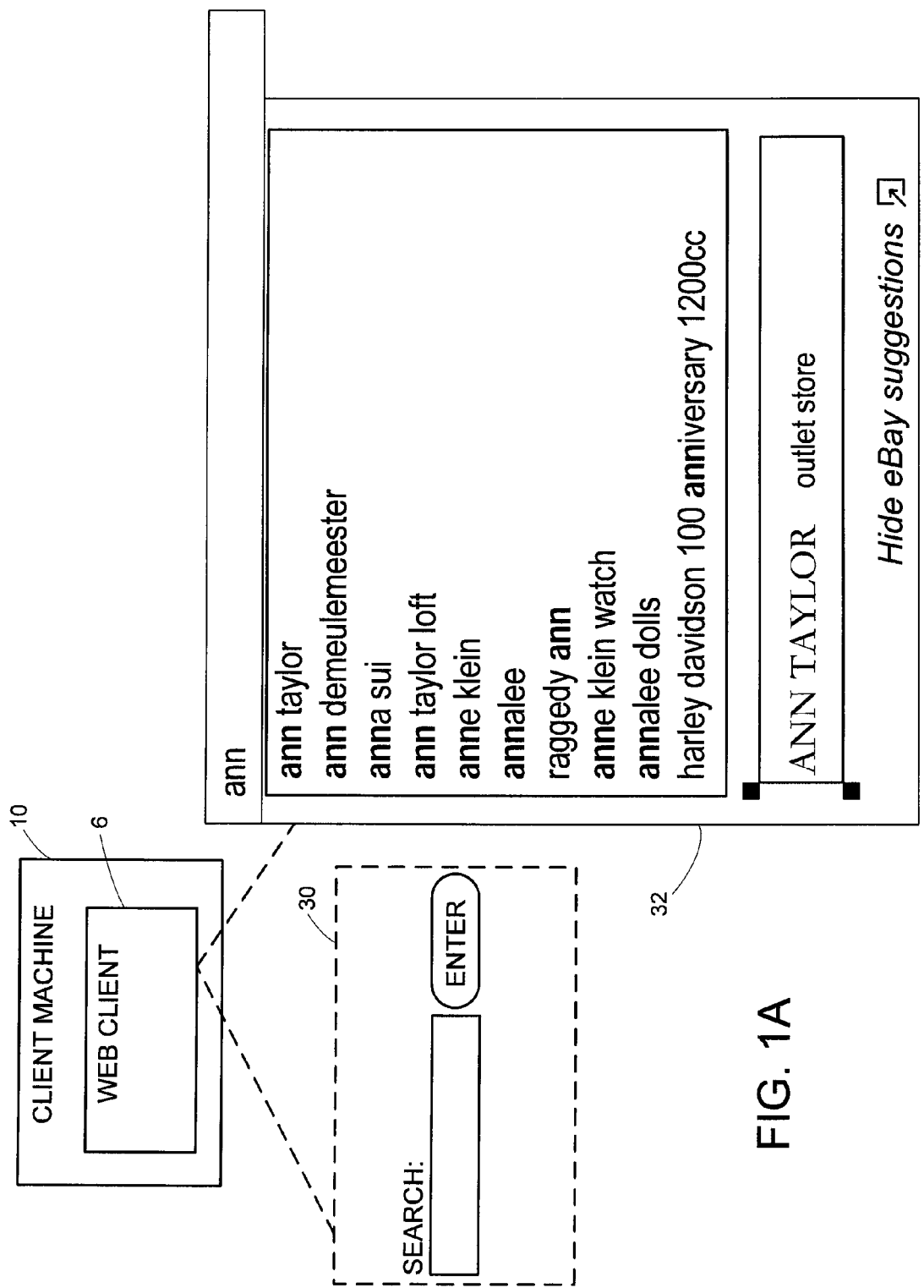
FIG. 1A illustrates an example of a search term input box and a drop down box for a graphical user interface for the web client of FIG. 1.

As illustrated by the user interface with reference number 30 of FIG. 1A, a user may be presented with a search interface 31 in the web client 6, with which the user can specify one or more search terms to be used in a search request submitted to the networked system 2 via network 4. In some embodiments, in addition to specifying search terms, users may be able to select certain item attributes, such as the desired color of an item, the item categories that are to be searched, and so on. After receiving and processing the search request, the networked system 2 communicates a response to the web client 6. For instance, the response can be an Internet document or web page that, when rendered by the web client 6, displays a search results page showing one or more item listings that satisfy the user's search request.

FIG. 1 also illustrates a third party application 28, executing on a third party server machine 30, as having programmatic access to the networked system 2 via the programmatic interface provided by the API server 14. For example, the third party application 28 may, utilizing information retrieved from the networked system 2, support one or more features or functions on a website hosted by the third party. The third party website may, for example, provide one or more promotional, marketplace or payment functions that are supported by the relevant applications of the networked system 2.

Marketplace Applications

Figure 2:
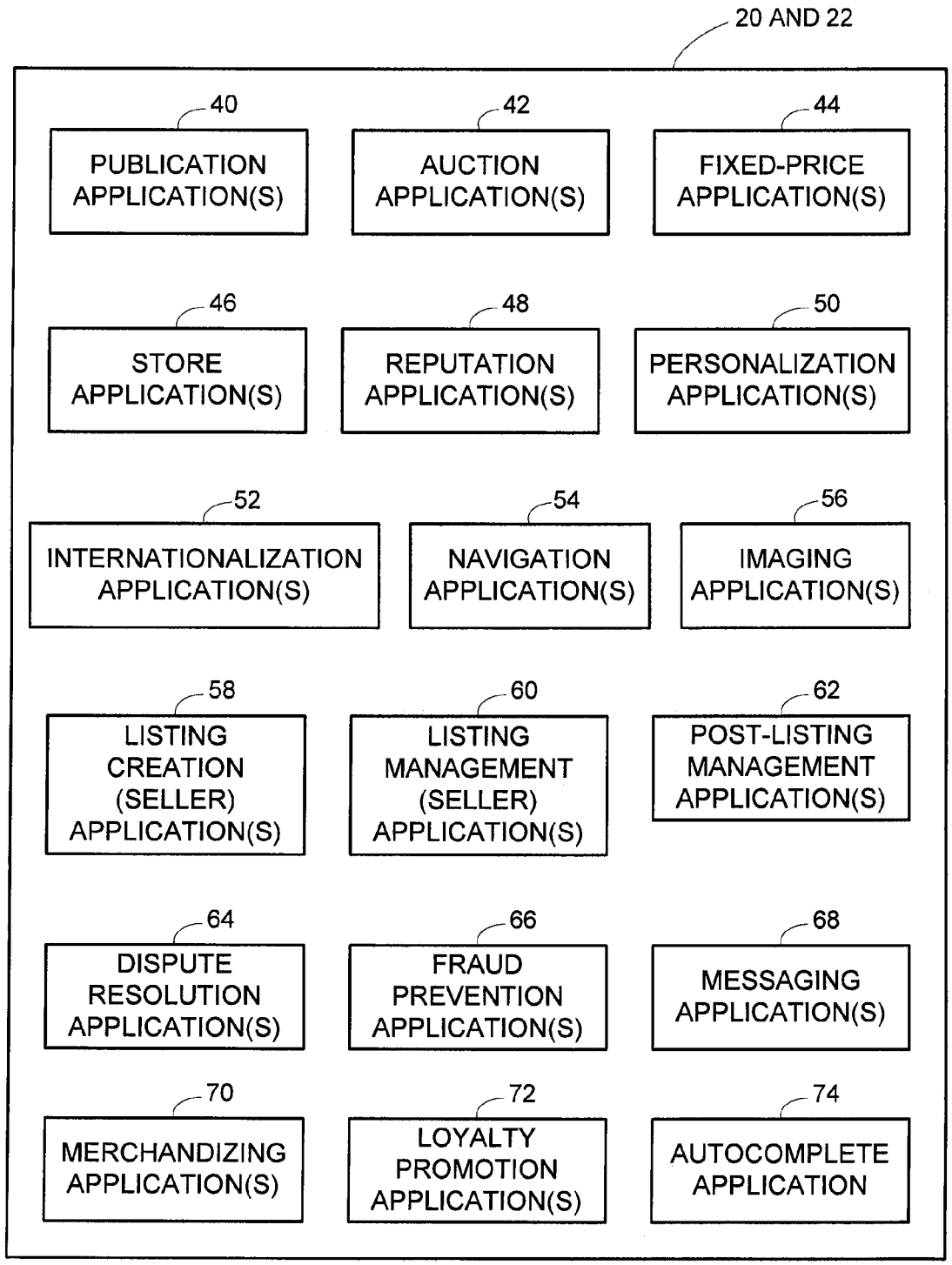
FIG. 2 illustrates an example of the various functional components or modules of a network-connected client system and server system, according to an embodiment of the invention.

FIG. 2 is a block diagram illustrating multiple applications 20 and 22 that, in one example embodiment, are provided as part of the networked system 2. The applications 20 may be hosted on dedicated or shared server machines (not shown) that are communicatively coupled to enable communications between server machines. The applications themselves are communicatively coupled (e.g., via appropriate interfaces) to each other and to various data sources, so as to allow information to be passed between the applications or so as to allow the applications to share and access common data. The applications may furthermore access one or more databases 26 via the database servers 28.

The networked system 2 may provide a number of publishing, listing and price-setting mechanisms whereby a seller may list (or publish information concerning) goods or services for sale, a buyer can express interest in or indicate a desire to purchase such goods or services, and a price can be set for a transaction pertaining to the goods or services. To this end, the marketplace applications 20 are shown to include at least one publication application 40 and one or more auction applications 42 which support auction-format listing and price setting mechanisms (e.g., English, Dutch, Vickrey, Chinese, Double, Reverse auctions etc.). The various auction applications 42 may also provide a number of features in support of such auction-format listings, such as a reserve price feature whereby a seller may specify a reserve price in connection with a listing and a proxy-bidding feature whereby a bidder may invoke automated proxy bidding.

A number of fixed-price applications 44 support fixed-price listing formats (e.g., the traditional classified advertisement-type listing or a catalogue listing) and buyout-type listings. Specifically, buyout-type listings (e.g., including the Buy-It-Now (BIN) technology developed by eBay Inc., of San Jose, Calif.) may be offered in conjunction with auction-format listings, and allow a buyer to purchase goods or services, which are also being offered for sale via an auction, for a fixed-price that is typically higher than the starting price of the auction.

Store applications 46 allow a seller to group listings within a "virtual" store, which may be branded and otherwise personalized by and for the seller. Such a virtual store may also offer promotions, incentives and features that are specific and personalized to a relevant seller.

Reputation applications 48 allow users that transact, utilizing the networked system 2, to establish, build and maintain reputations, which may be made available and published to potential trading partners. Consider that where, for example, the networked system 2 supports person-to-person trading, users may otherwise have no history or other reference information whereby the trustworthiness and credibility of potential trading partners may be assessed. The reputation applications 48 allow a user, for example through feedback provided by other transaction partners, to establish a reputation within the networked system 2 over time. Other potential trading partners may then reference such a reputation for the purposes of assessing credibility and trustworthiness.

Personalization applications 50 allow users of the networked system 2 to personalize various aspects of their interactions with the networked system 2. For example a user may, utilizing an appropriate personalization application 50, create a personalized reference page at which information regarding transactions to which the user is (or has been) a party may be viewed. Further, a personalization application 50 may enable a user to personalize listings and other aspects of their interactions with the networked system 2 and other parties.

The networked system 2 may support a number of marketplaces that are customized, for example, for specific geographic regions. A version of the networked system 2 may be customized for the United Kingdom, whereas another version of the networked system 2 may be customized for the United States. Each of these versions may operate as an independent marketplace, or may be customized (or internationalized) presentations of a common underlying marketplace. The networked system 2 may accordingly include a number of internationalization applications 52 that customize information (and/or the presentation of information) by the networked system 2 according to predetermined criteria (e.g., geographic, demographic or marketplace criteria). For example, the internationalization applications 52 may be used to support the customization of information for a number of regional websites that are operated by the networked system 2 and that are accessible via respective web servers 16.

Navigation of the networked system 2 may be facilitated by one or more navigation applications 54. For example, a search application (as an example of a navigation application) may enable key word searches of listings published via the networked system 2. A browse application may allow users to browse various category, catalogue, or inventory data structures according to which listings may be classified within the networked system 2. Various other navigation applications may be provided to supplement the search and browsing applications.

In order to make listings, available via the networked system 2, as visually informing and attractive as possible, the marketplace applications 20 may include one or more imaging applications 56 which users may upload images for inclusion within listings. An imaging application 56 also operates to incorporate images within viewed listings. The imaging applications 56 may also support one or more promotional features, such as image galleries that are presented to potential buyers. For example, sellers may pay an additional fee to have an image included within a gallery of images for promoted items.

Listing creation applications 58 allow sellers conveniently to author listings pertaining to goods or services that they wish to transact via the networked system 2, and listing management applications 60 allow sellers to manage such listings. Specifically, where a particular seller has authored and/or published a large number of listings, the management of such listings may present a challenge. The listing management applications 60 provide a number of features (e.g., auto-relisting, inventory level monitors, etc.) to assist the seller in managing such listings. One or more post-listing management applications 62 also assist sellers with a number of activities that typically occur post-listing. For example, upon completion of an auction facilitated by one or more auction applications 42, a seller may wish to leave feedback regarding a particular buyer. To this end, a post-listing management application 62 may provide an interface to one or more reputation applications 48, so as to allow the seller conveniently to provide feedback regarding multiple buyers to the reputation applications 48.

Dispute resolution applications 64 provide mechanisms whereby disputes arising between transacting parties may be resolved. For example, the dispute resolution applications 64 may provide guided procedures whereby the parties are guided through a number of steps in an attempt to settle a dispute. In the event that the dispute cannot be settled via the guided procedures, the dispute may be escalated to a third party mediator or arbitrator.

A number of fraud prevention applications 66 implement fraud detection and prevention mechanisms to reduce the occurrence of fraud within the networked system 2.

Messaging applications 68 are responsible for the generation and delivery of messages to users of the networked system 2, such messages for example advising users regarding the status of listings at the networked system 2 (e.g., providing "outbid" notices to bidders during an auction process or to provide promotional and merchandising information to users). Respective messaging applications 68 may utilize any one of a number of message delivery networks and platforms to deliver messages to users. For example, messaging applications 68 may deliver electronic mail (e-mail), instant message (IM), Short Message Service (SMS), text, facsimile, or voice (e.g., Voice over IP (VoIP)) messages via the wired (e.g., the Internet), Plain Old Telephone Service (POTS), or wireless (e.g., mobile, cellular, WiFi, WiMAX) networks.

Merchandising applications 70 support various merchandising functions that are made available to sellers to enable sellers to increase sales via the networked system 2. The merchandising applications 70 also operate the various merchandising features that may be invoked by sellers, and may monitor and track the success of merchandising strategies employed by sellers. The networked system 2 itself, or one or more parties that transact via the networked system 2, may operate loyalty programs that are supported by one or more loyalty/promotions applications 72. For example, a buyer may earn loyalty or promotions points for each transaction established and/or concluded with a particular seller, and be offered a reward for which accumulated loyalty points can be redeemed. An auto-complete application 74 supports an auto-complete function. Auto-complete modules are well known and auto-complete is a feature provided by many web browsers, search engine, and other technology devices. Auto-complete involves the program predicting a word or phrase that the user wants to type into a command or query line, without the user actually typing it in completely. Auto-complete can speed up human-computer interactions.

Data Structures

Figures 3, 4A:
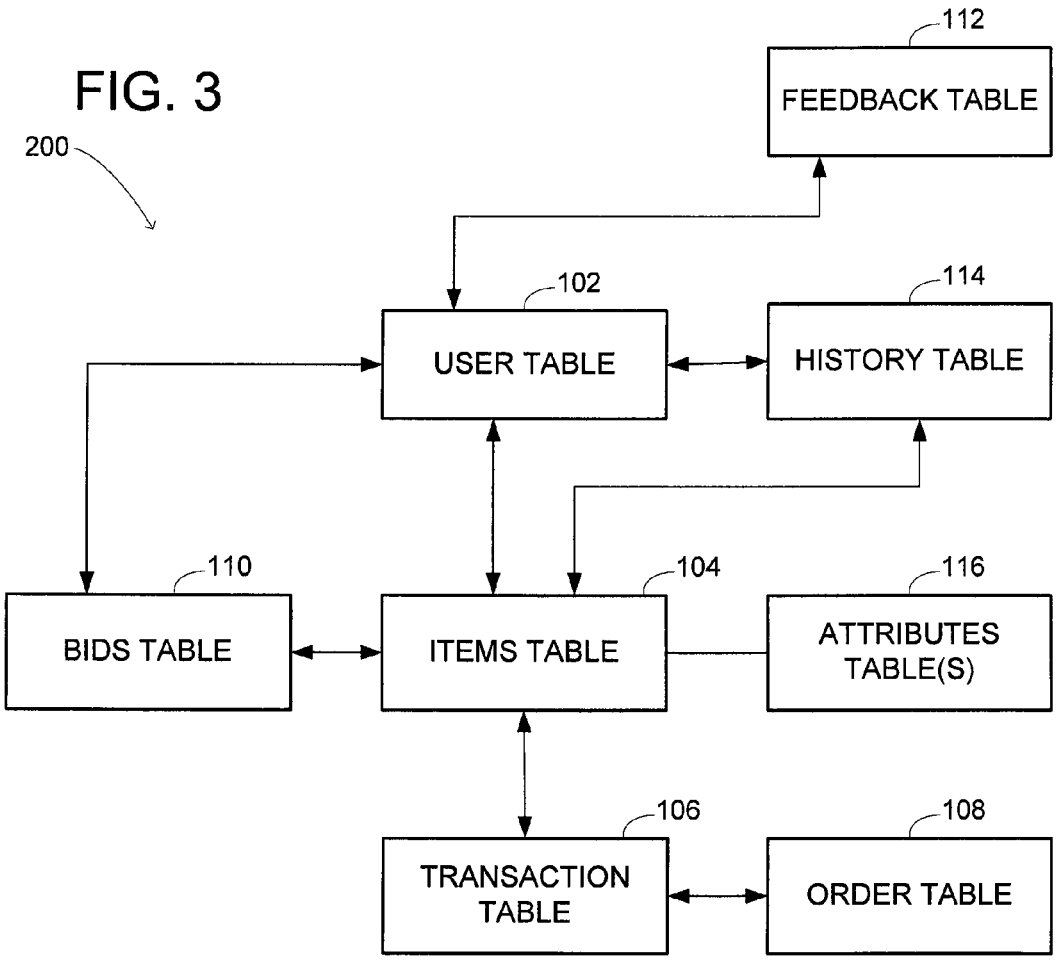
FIG. 3 illustrates a high-level entity-relationship diagram illustrating various tables that may be maintained within databases of the networked system of FIG. 2.
FIG. 4A illustrates one manner in which configuration files useable in an embodiment of the invention might be identified.

FIG. 3 is a high-level entity-relationship diagram, illustrating various tables 200 that may be maintained within the databases 26, and that are utilized by and support the applications 20 and 22. A user table 102 contains a record for each registered user of the networked system 2, and may include identifier, address and financial instrument information pertaining to each such registered user. A user may operate as a seller, a buyer, or both, within the networked system 2. In one example embodiment, a buyer may be a user that has accumulated value (e.g., commercial or proprietary currency), and is accordingly able to exchange the accumulated value for items that are offered for sale by the networked system 2.

The tables 200 also include an items table 104 in which are maintained item records for goods and services that are available to be, or have been, transacted via the networked system 2. Each item record within the items table 104 may furthermore be linked to one or more user records within the user table 102, so as to associate a seller and one or more actual or potential buyers with each item record.

A transaction table 106 contains a record for each transaction (e.g., a purchase or sale transaction) pertaining to items for which records exist within the items table 104.

An order table 108 is populated with order records, each order record being associated with an order. Each order, in turn, may be with respect to one or more transactions for which records exist within the transaction table 106.

Bid records within a bids table 110 each relate to a bid received at the networked system 2 in connection with an auction-format listing supported by an auction application 2. A feedback table 112 is utilized by one or more reputation applications 8, in one example embodiment, to construct and maintain reputation information concerning users. A history table 114 maintains a history of transactions to which a user has been a party. One or more attributes tables 116 record attribute information pertaining to items for which records exist within the items table 104. Considering only a single example of such an attribute, the attributes tables 116 may indicate a currency attribute associated with a particular item, the currency attribute identifying the currency of a price for the relevant item as specified in by a seller.

In one embodiment, when a user enters, or as a user is entering, a query into the search interface 31 of web client 6 illustrated in FIG. 1A, the system functions to use the query (also called the "user key word") as a search argument for a search engine, to search a file to find one or more pictures illustrating information about a product or service represented by the query. The picture could illustrate where the queried product or service may be purchased. The picture, which could be the name of an outlet store, a link to an online store, or a product suggestion, or a combination thereof, is displayed in a display that could be a dropdown display 32 of the user interface of web client 6. Auto-complete processes may also be used to process the query to generate an auto-suggestion key word to use as a search argument for the search engine.

In one embodiment, the query may be the name of a brand or of a product, and the relevant picture(s) will ultimately be displayed on the user interface of web client 6, such as by being integrated or displayed into the auto-complete dropdown box 32.

Configuration files could be used for the files that include the pictures. In computing, configuration files are well known, and configure the initial settings for some computer programs. They are used for user applications, server processes and operating system settings. The files are often written in ASCII and line-oriented, with lines terminated by a newline or carriage return/line feed pair, depending on the operating system. They may be considered a simple database.

The pictures may be located in a configuration file. There may be many configuration files, each with one picture in this particular embodiment although other compositions of pictures and configuration files could be used. When a user begins entering a search query, such as a brand or a product, the auto-complete application will be triggered into action by a minimum number of letters of the query entered by the user. As one example, the auto-complete application will be triggered by the entering of three letters, and will generate an appropriate completed query called an "auto-suggestion key word" which can be used as a search argument to search the configuration files to display a picture that matches the search argument.

In the above example, the reason to generate an auto-suggestion key word after three letters instead of two letters is that the system has a greater probability of guessing what the user wants by using three letters to generate the auto-suggestion key word. For example, if the user inputs "ip" (two letters), the system won't know for certain whether the user wants an ipod or an iphone. On the other hand, if the user inputs "ipo" (three letters), the system has a higher probability of being successful by surfacing ipod as the product the user is seeking.

The user may complete the entry (independent of the auto-complete function) and may generate a user input key word query. The query may be, for example, a brand name or a product. Both the user input key word and the auto-suggestion key word can be used as search arguments for the search engine to search the configuration files for a picture that matches user input key word or the auto-suggestion key word, as explained more fully below. The picture could inform the user by way of the drop down display of the brand and/or the store at which products sold under the brand, or product named by the search argument, can be purchased.

There can be many configuration files, with pictures matched with the user input key word (query) or the auto-suggestion key word. In one embodiment there can be one picture per configuration file, and many, many configuration files. Configuration files may be distinguished by identifying numbers such as 100, 110, 120, 130, . . . , N, or whatever other numbering system the system designer prefers to use. In one embodiment the configuration files with the smaller numbers will have higher priority and will be searched first, and then configuration files with larger numbers can be searched. For example, the lowest number configuration file can be searched first and if no match is found, the next higher numbered configuration file can be searched, and so on. One of ordinary skill in the art will recognize that this is but one search scheme and that many search schemes can be used without departing from the spirit or the scope of the invention.

The mapping of pictures and associated destination page URLs can be implemented in the configuration files. An example of a possible way names and formats for the configuration files can be implemented is in FIG. 4A where the file name, the file number and an example of the number and of the picture are illustrated. FIG. 4B illustrates fields that might be in the configuration files, with explanation for each. The term "period" is the period of time the file picture is valid. Also illustrated in FIG. 4B is a page URL which would be the page the picture URL drives the user to when the user clicks the picture, also as discussed subsequently.

One search logic that can be used is to give the user input key word priority over the auto-suggestion key word. The system would search a configuration file using the user input query as a first search argument. If a matched picture is found using the query, the picture can be displayed. If there is no match using the query as a first search argument, the system may search the configuration file for a picture matched with the auto-suggestion key word as a second search argument. The system will continue searching subsequent files in that order, first using the user input query and next using the auto-suggestion key word, until there is a matched picture found. The picture can then be published to the user interface via the auto-complete dropdown display, in the embodiment under discussion.

The foregoing search logic can be seen broadly in the method illustrated in FIG. 5. With auto-complete active, the user enters a query. When the user entered the minimum number of letters that triggers the auto-complete, the system generates an auto-suggestion key word from those letters. The user may complete the query that can be used a key word for search. Then the user key word (query) can be used by the system as the first search argument for searching the first configuration file. If the search results in a match, the system will transmit the picture for display on the user interface. If there is no match, the system can use the auto-suggestion key word as a second search argument to search the file for a picture that matches. If the auto-suggestion key word results in a match, the system will transmit the picture for display on the user interface. If no search is found the search continues with other files being searched in the sequence described until a matched picture is found.

FIG. 6 illustrates a further method that could be used in the search logic of the embodiment under discussion. The system may use the auto-suggestion key word as a first search argument to search a first file. If there is a match, the system may transmit the matching picture to be displayed on the user interface. If there is no match, the system can use the user input key word (query) as a second search argument to search the file for a picture that matches. If the query produces a match, the system can transmit the picture for display on the user interface. If no match is found with the query, the foregoing four steps can be repeated with the next file. If those four steps do not result in a match, the system can search the next file using the same search logic, and so on until a match is found.

Those skilled in the art will recognize that because the auto-complete function operates at electronic speeds, say microseconds, and the user keying in letters operates at mechanical speeds, say in the order of milliseconds, there will be a period of time (from the time the minimum number of letters, say three letters as an example, triggers the auto-complete, until the time the user completes keying in a user input key word). During that period of time there may be no user input key word. During that period of time, and without departing from the described scope, the search logic can be modified from the above description so as to search the configuration files using the auto-suggestion key word until the user input key word is generated. If a match is found using the auto-suggestion key word, the picture matched can be used for display at the user interface. If no match is found during that period of time using the auto-suggestion key word, the system can go back and search the configuration files that were already searched with the auto-suggestion key word, this time using the now-generated user input query to determine whether there is a match. If a match is found using the query it can be displayed. If the user query search "catches up" to the highest configuration file searched by the auto-suggestion key word with no match being found, the system can then revert to the search logic in FIG. 5 or FIG. 6 for the subsequent configuration files until a match is found.

Figure 7:
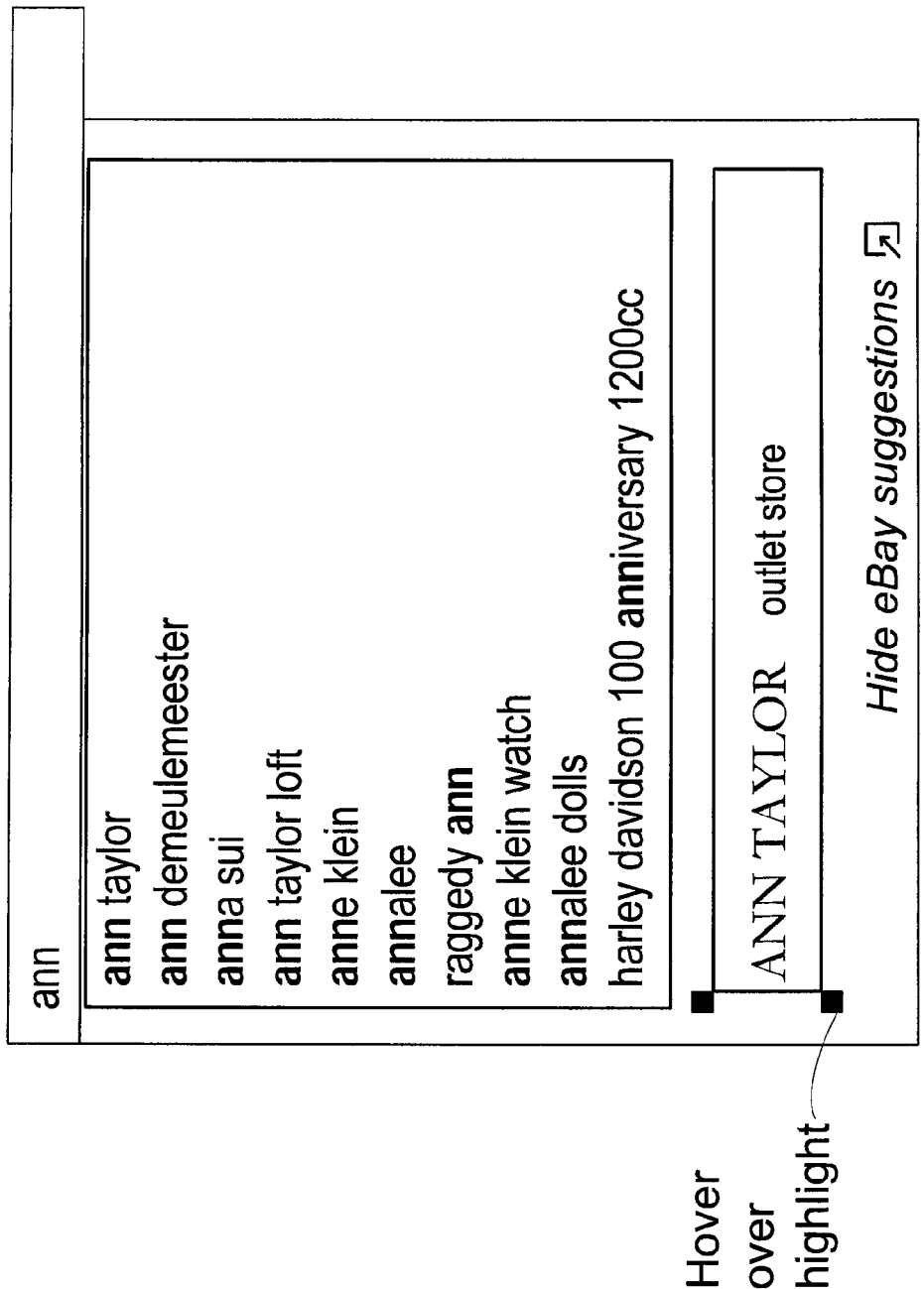
FIG. 7 illustrates how a picture relating to key search words might be positioned in a drop-down box according to one embodiment of the invention.
Figure 8:
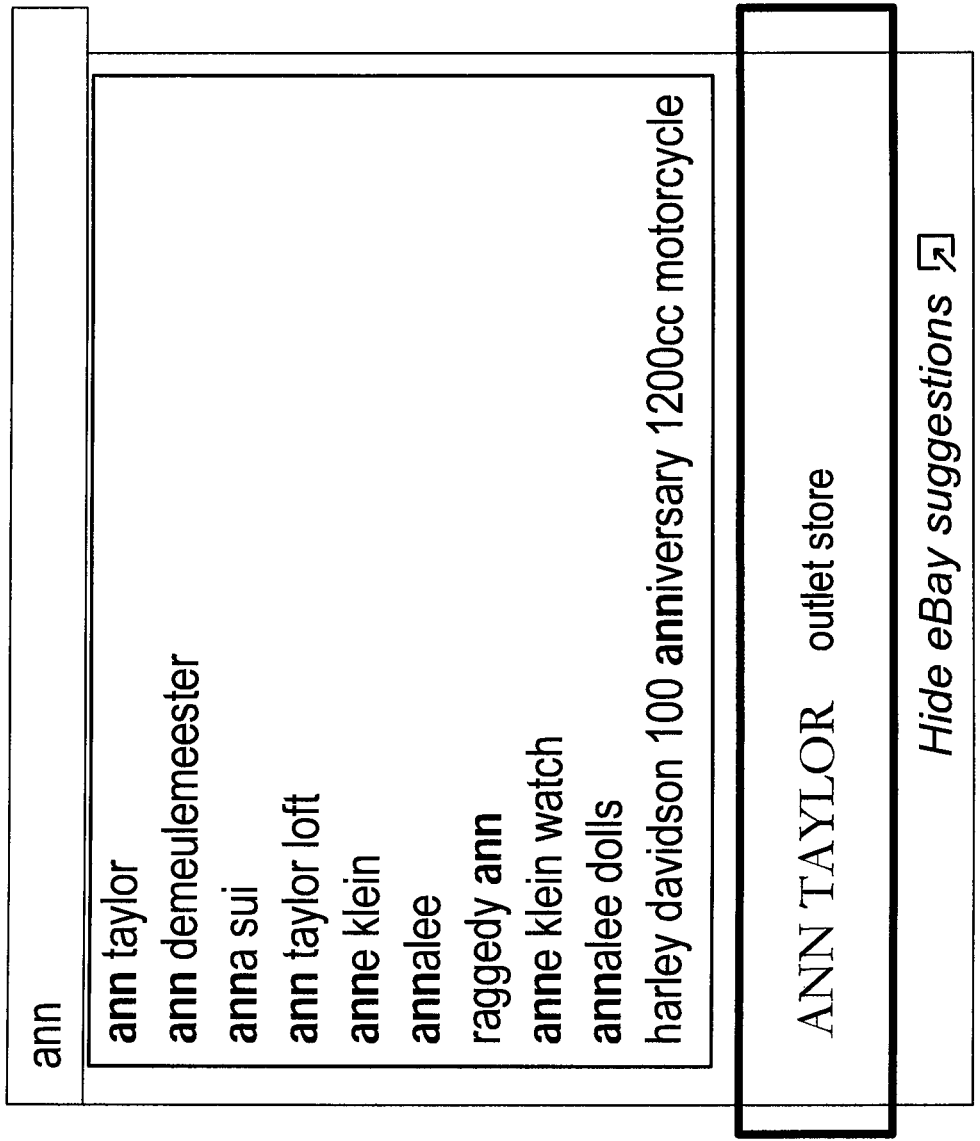
FIG. 8 illustrates one embodiment of stretching the drop-down box according to an embodiment of the invention.

In one embodiment, the picture can be displayed in the bottom of the drop down box, after plain text search suggestions to locate the picture, and/or popular product search suggestions to locate a suggested product as desired. This is seen in FIG. 7. In this example, any of the query's in the drop down list (ann taylor, ann demeule meester, anna sui, ann taylor loft, anne klein, annalee, raggedy ann, anne klein watch, annalee dolls, harley davidson $10^{th}$ anniversary) can cause the auto-complete function to generate the single auto-suggestion key word "Ann Taylor." A match with a picture in a configuration file, using the above search strategy or another appropriate search strategy, will cause the picture "Ann Taylor outlet store" for this example to be transmitted to the user interface for display. When a user uses the keyboard (up or down), or mouse, to control the cursor locating the picture, the selected picture can be highlighted with background color. If the user then selects "enter," the user can be led to the corresponding page identifying various aspects of the Ann Taylor outlet store. As seen in FIG. 8, stretching the search box can result in the picture being stretched, but still remain left aligned if desired. FIG. 9 illustrates examples of the Plain Text, Product, and Traffic Driver pictures that may be used. As illustrated in FIG. 9, the Traffic Driver picture can drive user traffic to the named outlet store. The picture can also include a link to the store as part of the traffic driver process.

FIG. 10 illustrates the picture in a drop down display with a web page in the background.

An example of a search of configuration files is seen in FIGS. 11A through 11D. In FIG. 11A two graphics, or pictures, are illustrated, A for Ann Taylor and B for Anna Sui. FIG. 11B shows one possible configuration file for graphic A. FIG. 11C shows one possible configuration file for graphic B. FIG. 11D shows a step by step illustration of the pictures what would be displayed with various queries that could relate either to Ann Taylor or Anna Sui, and the reasoning for the behavior of the system.

Figure 12:
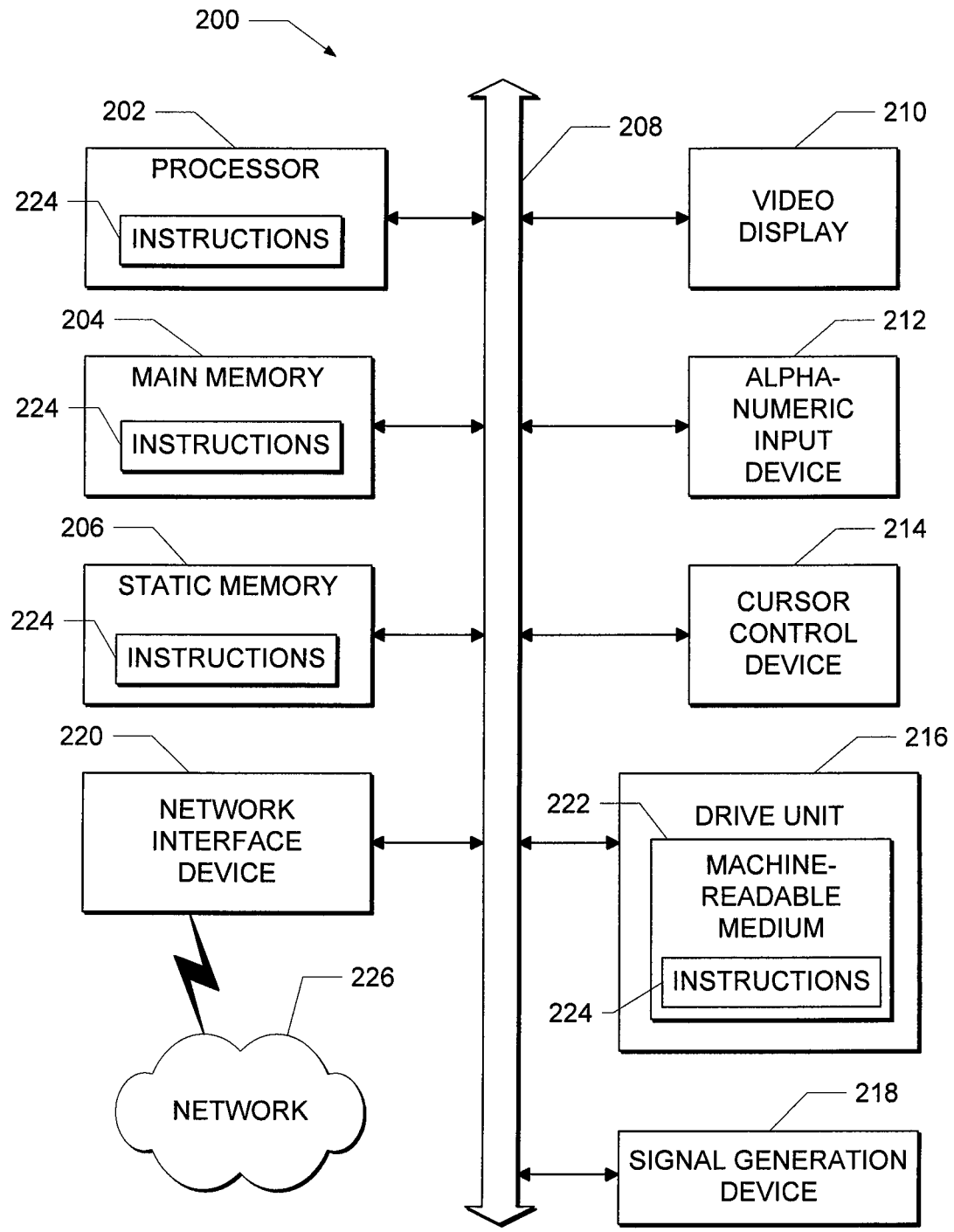
FIG. 12 is a block diagram of a machine in the form of a computer system within which a set of instructions, for causing the machine to perform any one or more of the methodologies discussed herein, may be executed.

FIG. 12 shows a diagrammatic representation of machine in the example form of a computer system 200 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a server computer, a client computer, a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 200 includes a processor 202 (e.g., a central processing unit (CPU) a graphics processing unit (GPU) or both), a main memory 204 and a static memory 206, which communicate with each other via a bus 208. The computer system 200 may further include a video display unit 210 (e.g., a liquid crystal display (LCD) or a cathode ray tube (CRT)). The computer system 200 also includes an alphanumeric input device 212 (e.g., a keyboard), a cursor control device 214 (e.g., a mouse), a disk drive unit 216, a signal generation device 218 (e.g., a speaker) and a network interface device 220.

The software 224 may further be transmitted or received over a network 226 via the network interface device 220. While the machine-readable medium 222 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention. The term "machine-readable medium" shall accordingly be taken to include, but not be limited to, solid-state memories, optical and magnetic media, and carrier wave signals.

Thus, a method and system using an auto-complete function to drive traffic to selected stores have been described. Although the present invention has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in fewer than all features of a single disclosed embodiment. Thus the following claims are hereby incorporated into the Detailed Description, with each claim standing on its own as a separate embodiment.

What is claimed is:

1. A system to search one or more files to find at least one picture, the system comprising:
   one or more computer processors;
   storage configured to receive and store a search query from a client machine;
   an auto-complete application to process the search query, the search query comprising a user-generated key word, to generate an auto-suggestion key word in response to detecting fewer than all of letters of the user-generated key word; and
   a search engine coupled to the auto-complete application and to use a first search argument and a second search argument to search at least one of the one or more files, using the user-generated keyword and the auto-suggestion key word to find the at least one picture,
   the search engine to search one of the one or more files using the user-generated key word as a search argument and,
   responsive to the at least one picture being found, to transmit the at least one picture, and
   responsive to the at least one picture not being found, to automatically search, without response to a new search query from the client machine, the one of the one or more files using the auto-suggestion key word as a search argument.

2. The system of claim 1 wherein the auto-complete server is configured to generate an auto-suggestion key word by using no fewer than three letters of the user-generated keyword.

3. The system of claim 1 further comprising a presentation server to present the at least one picture for display.

4. The system of claim 1 wherein, responsive to the at least one picture not being found using the auto-suggestion key word as the second search argument, the search engine searches other ones of the one or more files using user-generated key word as the first search argument and the auto-suggestion key word as the second search argument, until the at least one picture is found.

5. The system of claim 1 wherein the search engine searches one of the one or more files using the auto-suggestion key word as the first search argument and, responsive to the at least one picture not being found, searches the one of the one or more files using user-generated keyword as the second search argument.

6. The system of claim 5 wherein, responsive to the at least one picture not being found using user-generated keyword as the second search argument, the search engine searches other ones of the one or more files using the auto-suggestion key word as the first search argument and user-generated keyword as the second search argument, until the at least one picture is found.

7. The system of claim 1 wherein the at least one picture is configured to be transmitted as a selectable picture that includes a link to a web page indentifying aspects of an outlet store.

8. A method to find at least one picture in one or more files, the method comprising:
   configuring storage to receive and store a query from a client machine, the query comprising a user-generated key word;
   responsive to the query from the client machine, using an auto-complete server to process the query to generate an auto-suggestion key word in response to detecting fewer than all of letters of the user-generated key word; and
   using a search engine coupled to the auto-complete server to use a first search argument and a second search argument to search at least one of the one or more files, using the user- generated key word and the auto-suggestion key word to find the at least one picture, wherein the auto-suggestion key word is used automatically and without response to a new search query,
   the search engine searches one of the one or more files using the user-generated key word as a search argument and,
   responsive to the at least one picture being found, transmits the at least one picture, and
   responsive to the at least one picture not being found, automatically searches, without response to a new search query from the client machine, the one of the one or more files using the auto-suggestion key word as a search argument.

9. The method of claim 8 wherein the auto-complete server is configured to generate an auto-suggestion key word by using no fewer than three letters of the user-generated keyword.

10. The method of claim 8 further comprising using a presentation server to present the at least one picture for display.

11. The method of claim 10 wherein the display is a drop down display.

12. The method of claim 8 further comprising, responsive to a plurality of different queries, using the search engine to find the same picture.

13. The method of claim 8 wherein the at least one picture is at least one of a group consisting of plain text, product, and traffic driver.

14. The method of claim 8 wherein the one or more files are configuration files.

15. The method of claim 8 wherein the at least one picture comprises a brand name.

16. The method of claim 15 wherein the at least one picture further comprises an identification of a store that sells products under the brand name and a link to an online page for the store.

17. The method of claim 8 wherein the at least one picture comprises an image of a product.

18. The method of claim 17 wherein the at least one picture further comprises an identification of a store that sells the product and a link to an online page for the store that sells the product.

19. The method of claim 8 further comprising, responsive to the query, using the search engine to find a plurality of different pictures for the user to select.

20. The method of claim 19 further comprising, responsive to the user selecting one of the plurality of pictures, using the search engine to find a link to an online page that identifies various aspects of the selected picture.

21. The method of claim 8 further comprising using the search engine to search one of the one or more files using the user-generated key word as the first search argument and, responsive to the at least one picture not being found, using the search engine to search the one of the one or more files using the auto-suggestion key word as the second search argument.

22. The method of claim 21 further comprising, responsive to the at least one picture not being found using the auto-suggestion key word as the second search argument, using the search engine to search other ones of the one or more files using the user-generated key word as the first search argument and the auto-suggestion key word as the second search argument, until the at least one picture is found.

23. The method of claim 8 further comprising using the search engine to search one of the one or more files using the auto-suggestion key word as the first search argument and, responsive to the at least one picture not being found, using the search engine to search the one of the one or more files using the user-generated key word as the second search argument.

24. The method of claim 23 further comprising, responsive to the at least one picture not being found using the user-generated key word as the second search argument, using the search engine to search other ones of the one or more files using the auto-suggestion key word as the first search argument and the user-generated key word as the second search argument, until the at least one picture is found.

25. The method of claim 8 wherein the at least one of the one or more files is distinguished by an identifying number, the numbers ranging from lower numbers to higher numbers, and the search proceeds from files distinguished by lower identifying numbers to files distinguished by higher identifying numbers.

26. The method of claim 8 wherein the at least one of the one or more files is distinguished by an identifying number, the numbers ranging from lower numbers to higher numbers, and the search proceeds from files distinguished by higher identifying numbers to files distinguished by lower identifying numbers.

27. The method of claim 8 wherein the at least one picture is configured to be transmitted as a selectable picture that includes a link to a web page identifying aspects of an outlet store.

28. A computer-readable storage device having embedded therein a set of instructions which, when executed by one or more processors of the computer causes the computer to execute operations comprising:
configuring storage to receive and store a query from a client machine, the query comprising a user-generated key word;
responsive to the query from the client machine, using an auto-complete server to process the query to generate an auto-suggestion key word in response to detecting fewer than all of letters of the user-generated key word; and
using a search engine coupled to the auto-complete server and configured to use a first search argument and a second search argument for searching at least one of the one or more files, using the user-generated key word and the auto-suggestion key word to find the at least one picture, wherein the auto-suggestion key word is used automatically and without response to a new search query,
the search engine searches one of the one or more files using the user-generated key word as a search argument and,
responsive to the at least one picture being found, transmits the at least one picture, and
responsive to the at least one picture not being found, automatically searches, without response to a new search query from the client machine, the one of the one or more files using the auto-suggestion key word as a search argument.

29. The computer-readable storage device of claim 28 the operations further comprising generating an auto-suggestion key word by using no fewer than three letters of the user-generated keyword.

30. The computer-readable storage device of claim 28 the operations further comprising using a presentation server to present the at least one picture for display.

31. The computer-readable storage device of claim 30 the operations further comprising using the presentation server to present the at least one picture for display on a drop down display.

32. The computer-readable storage device of claim 28 the operations further comprising, responsive to a plurality of different queries, using the search engine to find the same picture.

33. The computer-readable storage device of claim 28 wherein the at least one picture is one of a group consisting of plain text, product, and traffic driver.

34. The computer-readable storage device of claim 28 wherein the one or more files are configuration files.

35. The computer-readable storage device of claim 28 wherein the at least one picture comprises a brand name.

36. The computer-readable medium of claim 35 wherein the at least one picture further comprises an identification of a store that sells products under the brand name and a link to an online page for the store.

37. The computer-readable storage device of claim 28 wherein the at least one picture comprises an image of a product.

38. The computer-readable storage device of claim 37 wherein the at least one picture further comprises an identification of a store that sells the product and a link to an online page for the store that sells the product.

39. The computer-readable storage device of claim 28 the operations further comprising, responsive to the user-generated key word, using the search engine to find a plurality of different pictures for the user to select.

40. The computer-readable storage device of claim 39 the operations further comprising, responsive to the user selecting one of the plurality of pictures, using the search engine to find a link to an online page identifying various aspects of the selected picture.

41. The computer-readable storage device of claim 28 the operations further comprising using the search engine to search one of the one or more files using the user-generated key word as the first search argument and, responsive to the at least one picture not being found, using the search engine to search the one of the one or more files using the auto-suggestion key word as the second search argument.

42. The computer-readable storage device of claim 41 the operations further comprising, responsive to the at least one picture not being found using the auto-suggestion key word as the second search argument, using the search engine to search other ones of the one or more files using the user-generated key word as the first search argument and the auto-suggestion key word as the second search argument, until the at least one picture is found.

43. The computer-readable storage device of claim 28 the operations further comprising using the search engine to search one of the one or more files using the auto-suggestion key word as the first search argument and, responsive to the at least one picture not being found, using the search engine to search the one of the one or more files using the user-generated key word as the second search argument.

44. The computer-readable storage device of claim 43 the operations further comprising, responsive to the at least one picture not being found using the user-generated key word as the second search argument, using the search engine to search other ones of the one or more files using the auto-suggestion key word as the first search argument and the user-generated key word as the second search argument, until the at least one picture is found.

45. The computer-readable storage device of claim 28 the operations further comprising using the auto-suggestion key word as a search argument to search files until the user-generated key word is entered and, if no match is found, using the user-generated key word as a search argument to search at least some of the files that were searched using the auto-suggestion key word as a search argument.

46. The computer-readable storage device of claim 28 wherein the at least one picture is configured to be transmitted as a selectable picture that includes a link to a web page identifying aspects of an outlet store.

* * * * *

UNITED STATES PATENT AND TRADEMARK OFFICE
CERTIFICATE OF CORRECTION

PATENT NO. : 8,819,052 B2
APPLICATION NO. : 12/916198
DATED : August 26, 2014
INVENTOR(S) : Zhang et al.

Page 1 of 1

It is certified that error appears in the above-identified patent and that said Letters Patent is hereby corrected as shown below:

In the claims

In column 11, line 61, in Claim 7, delete "indentifying" and insert --identifying--, therefor Signed and Sealed this
Twenty-seventh Day of October, 2015

Michelle K. Lee
*Director of the United States Patent and Trademark Office*